UNITED STATES PATENT OFFICE.

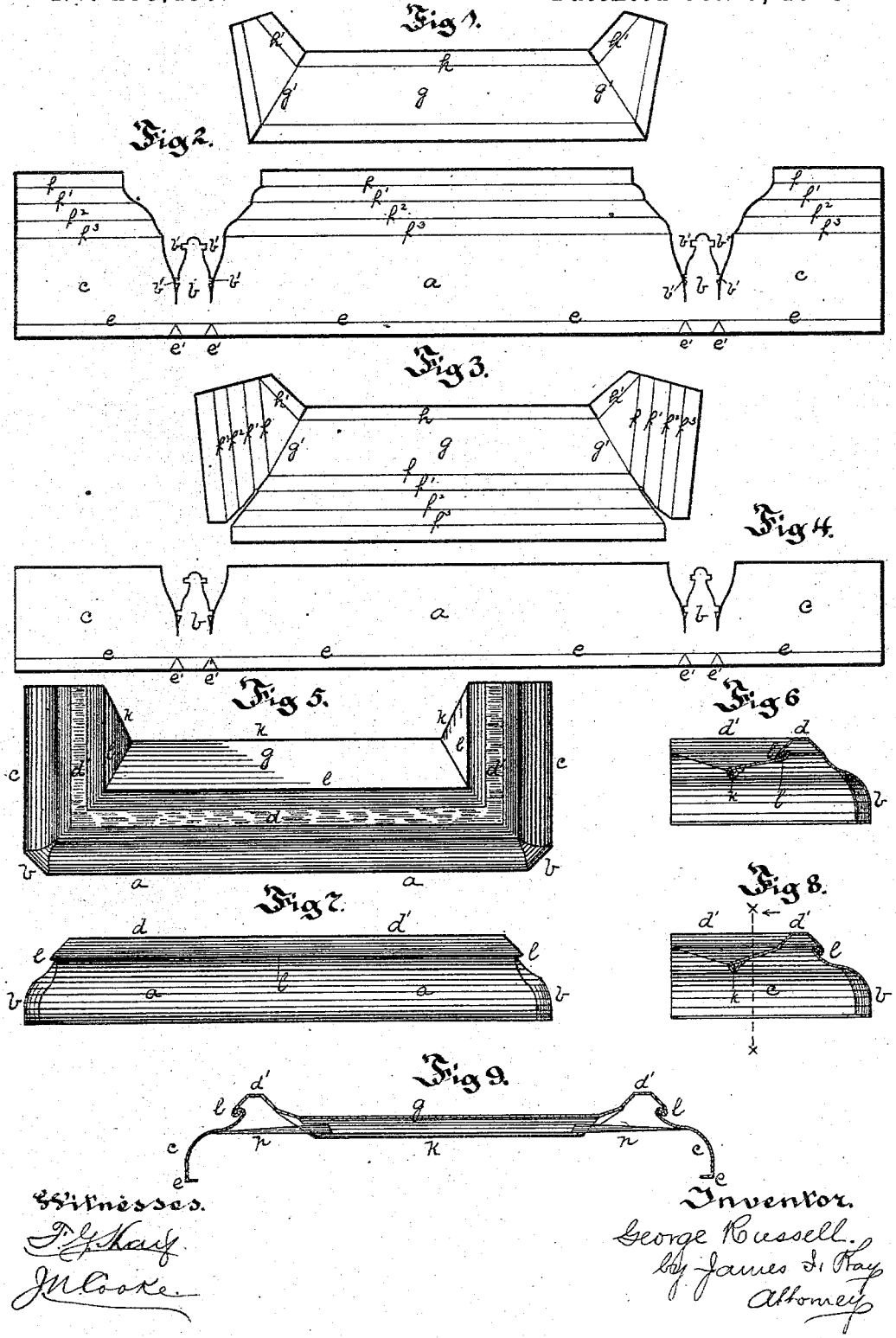

GEORGE RUSSELL, OF McKEESPORT, PENNSYLVANIA, ASSIGNOR TO HIMSELF AND JAMES S. KUHN, OF SAME PLACE.

MANUFACTURE OF SHEET-METAL FENDERS.

SPECIFICATION forming part of Letters Patent No. 286,490, dated October 9, 1883.

Application filed June 27, 1883. (No model.)

*To all whom it may concern:*

Be it known that I, GEORGE RUSSELL, of McKeesport, in the county of Allegheny and State of Pennsylvania, have invented a new and useful Improvement in Manufacture of Sheet-Metal Fenders; and I do hereby declare the following to be a full, clear, and exact description thereof.

My invention relates to the manufacture of sheet-metal fenders, its object being to form a fender which is light in weight, cheap in construction, and one which is suitably braced to withstand any weight or strain upon it.

It consists, essentially, in forming the front, corner-pieces, and ends of the fender in one piece and the apron in another piece, bending them to shape and uniting them by suitable means, the whole fender being properly braced, and being thus formed of two pieces of sheet metal, which can be cut from a sheet with but little waste material.

To enable others skilled in the art to make and use my invention, I will describe the same more fully, referring to the accompanying drawings, in which—

Figures 1 and 2 are views of the sheet-metal blanks cut to the desired shape for forming the fender where the seam uniting the apron with the front and ends is made along the inner side of the top ridge of the fender. Figs. 3 and 4 are like views where the seam uniting the apron with the front and ends is made along the outer side of the top ridge of the fender. Fig. 5 is a top view of the fender where the seam is formed along the inner side of the top ridge, and Fig. 6 is a cross-section of the same. Fig. 7 is a front view of the fender where the seam is formed along the outer side of the top ridge. Fig. 8 is a cross-section of the fender shown in Fig. 7; and Fig. 9 is a longitudinal section on the line $x\, x$, Fig. 8.

Like letters of reference indicate like parts in each.

The fender is formed from two pieces of sheet metal, the blank differing in form according to the location of the seam uniting the apron with the front and ends, the seam being formed in one case along the inner side of the top ridge, and the metal of the top ridge being part of the front and ends, and in the other case the seam being formed along the outer side of the top ridge, and the metal of the top ridge being part of the sheet forming the apron, the construction being substantially the same in either case. The metal of the front, ends, and corner-pieces is formed in one continuous strip along the base which rests on the floor, and on either side of the front $a$ are the corner-pieces $b$, the ends $c$ being beyond these. The metal is cut in the proper shape, and afterward brought up together, as shown in the views of the finished fender, the construction of the blank forming the front and ends being particularly described in an application of even date herewith, in which the sheet forming the fender is in one piece. Where the top ridge, $d$, is formed with the piece forming the front and ends, the sheets are cut as shown in Figs. 1 and 2, the sheet being first bent a short distance from the base thereof along the line $e$ at right angles to the sheet, and creased or folded at the points $e'$, below the corner-pieces, where the body of the fender is bent to form the angles, and a broad base for the fender to rest upon is thus obtained. The front and ends are then bent to the shape or curvature desired, and above the front and ends the blank is creased along the lines $f\, f'\, f^2 f^3$, to form the top ridge of the fender. The corner-pieces $b$ are curved or bent to substantially the shape or curvature of the front and ends, and are secured thereto by riveting or by means of suitable lips, $b'$, which extend through the slots in the body of the fender along the edges of the parts cut away, and are then bent over to lock them in place and brace the corners of the fender. The apron $g$ is then bent along the lines $g'$, so that the apron may be formed inclined from both the front $d$ and the ends $d'$ of the top ridge, and a neater fender thus obtained. It is then folded over along the lines $h\, h'$ around a suitable strengthening-wire, as at $k$, and the edges of the apron united to the edges of the front and ends by a suitable seam, $l$, along the inner side of the top ridges, $d\, d'$, this seam being preferably a double lock-seam, so as to give a firm union between the apron and front and ends of the fender. Instead of the seam, they may be united by riveting; but this cannot be made so neat. A suitable brace, $p$, is then secured to the apron, and to the ends of the fender, as described in the application of even date herewith, and the fender is finished ready for enameling. Where the top ridge is formed as part of the apron, the sheets are cut as shown in Figs. 3 and 4, and the lower edges of the front and ends are bent to form the base $e$, and they are given the proper curvature, and the corner-pieces secured thereto, as above described. The apron $g$ is then bent along the lines $g'$ to give the incline thereto, and the wire secured along the edge thereof, in the manner above described, and the part for forming the top ridge bent along the lines $f\, f'\, f^2\, f^3$, and it is then secured to the front and ends by means of the seam $l$, extending along the outer side of the top ridges, $d\, d'$, or riveted along said line, as desired. The braces $p$, extending from the apron to the end pieces, are then secured in place, and the fender is ready for enameling.

The fender can be bent to shape and seamed, or otherwise secured together, as above described, by suitable machinery at the expenditure of very little time and labor, and it forms a neat fender, which can be sold at a low price. It is so braced by the corner-pieces and the seam or joint uniting the front and ends with the apron, as well as the braces extending from the apron to the ends, that it is adapted to sustain any ordinary weight or strain brought upon it, and is therefore as durable as the ordinary cast-metal fender, and much lighter, so that it can be handled more easily. As will be seen from the drawings, the sheets from which the fender is formed can be formed from narrow strips of sheet metal and be cut with very little waste of material, and the cost of the fender, therefore, is less than where it is made from one sheet of metal. As there are no seams or joints on the face of the apron, it has also an improved appearance over the fender formed from one sheet of metal. By slight alterations in the curvature of the front and ends and the shape of the top ridge and apron many different forms of the same can be made. As the front and ends are formed in one continuous piece along the lower part of the body, it is not liable to be injured at the part most subjected to wear.

No special claim is made in this application to the matter claimed in my application of even date herewith, Serial No. 99,361.

What I claim as my invention, and desire to secure by Letters Patent, is—

A fender formed of a sheet-metal blank of such shape that when suitably bent it forms the front, corner-pieces, and ends of a single piece of sheet metal, said blank being united to the apron-blank by seaming, substantially as set forth.

In testimony whereof I, the said GEORGE RUSSELL, have hereunto set my hand.

GEORGE RUSSELL.

Witnesses:
JAMES I. KAY,
J. N. COOKE.